Sept. 24, 1929.  E. DRAULLETTE  1,728,991

PAVING BLOCK AND SLAB MADE OF RUBBER COMPOUND

Original Filed Jan. 4, 1924

E. Draullette
INVENTOR

By: Marks & Clark
Attys

Patented Sept. 24, 1929

1,728,991

UNITED STATES PATENT OFFICE

EDMOND DRAULLETTE, OF PARIS, FRANCE

PAVING BLOCK AND SLAB MADE OF RUBBER COMPOUND

Original application filed January 4, 1924, Serial No. 684,446. Divided and this application filed March 5, 1926. Serial No. 92,612.

This application is a division of application No. 684,446 filed January 4, 1924.

Numerous types of rubber paving blocks or slabs are already known as well as the methods for manufacturing and laying the same.

Paving blocks or slabs have already been formed by using, for the top side, a layer of rubber of superior quality, and for the under side, a layer constituted by a hardened mixture enclosing a wire gauze and a few cramps and by vulcanizing the whole for shaping blocks which are usually laid on a layer of cement or mortar newly spread upon a concrete bed in which the metallic cramps are driven for holding the paving blocks therein.

Small rubber plates are also formed having, on the under side, dovetail projections, these small rubber plates being usually placed on the wood paving, which is accordingly grooved for receiving the dovetail projections, or on a cement bed newly prepared.

Rubber plates are secured, by any adhesive means, on blocks made of wood, brick or other materials.

Blocks the upper layer of which is made of vulcanized rubber, have also been proposed and the remainder is composed of a mixture the main ingredient of which is sand.

This mixture comprises, alone or in combination: stones, granite, natural or baked clay, sand, cement, clinker, rock, fibrous or ligneous materials, leather, iron filings, generally speaking any animal, vegetable or mineral substance to which is added any kind of rubber, filling materials (organic or inorganic) or residues of petroleum. The whole is mixed with india rubber latex and if necessary with a suitable binding material and finally the mixture is compressed into the shape of blocks which are vulcanized as they are or covered with a layer of rubber.

All these processes and products show after experiments concerning wear, that rubber is the best of the paving materials used up to this day, but that it presents complications as far as the manufacture is concerned, that the cost price is very high and that, particularly, nobody has found a practical and strong means for securing the rubber paving block on the ground covered with concrete.

The most important problem to be actually solved consists therefore in securing the rubber paving block on the foundation in such a manner that the securing means resists to the stresses and pulling strains produced by heavy vehicles running at high speed.

This invention relates to improvements in paving and flagging made of rubber compound and is adapted to avoid or attenuate the above mentioned inconveniences.

It particularly consists in a process of manufacture of paving blocks and slabs or flags made of a composition formed of manufactured rubber waste and a mineral mixture, the latter having the property of suitably securing the paving blocks or slabs to the foundation.

The process of manufacture of paving blocks and slabs or flags consists especially in making, by moulding and by vulcanization under pressure, a tile, a brick or a flag, by using a composition made of natural or artificial rubber or similar products, preferably manufactured rubber waste, such as air tubes, covers, tyres, mats, etc., mixed in a hot condition with residues resulting from the treatment and purification of vegetal, animal or mineral fatty bodies and by incorporating in this composition, by passage between the mixing cylinders, sulphur of supervulcanization and a mineral mixture comprising sand, lime, cement, gravel, porphyry, sandstone powder, etc., alone or suitably mixed and capable of intimately binding with an intermediate layer of mortar or cement for securing the block to the foundation, and if necessary becoming united at its upper surface with a layer of composition containing a better quality of rubber.

The said block, being formed in a mould in layers containing progressively diminishing quantities of the mineral mixture is subsequently vulcanized under pressure. It can also, before or after vulcanization, be filled, in its cavities, with mortar or cement, forming an outer binding layer, and be applied, fresh or dry on the binding bed of the foundation or on bricks or agglomerates for forming together paving or flagging blocks ready for use.

The invention is described hereafter in detail with reference to the accompanying drawing illustrating, in cross sections, by way of example and diagrammatically, a few forms of execution of the paving blocks formed of a composition made of manufactured rubber waste and a mineral mixture.

Figure 1:
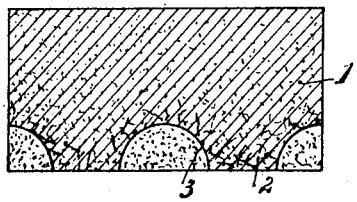
Figures 1 and 2 illustrate paving blocks formed of a composition made of manufactured rubber waste mixed with sand, lime, cement, gravel, etc.
Figure 2:
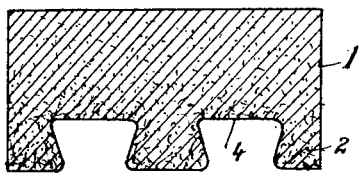

In the drawing, 1 designates a tile, plate, flag or brick constituted, by moulding and vulcanization under pressure, by a plastic and resilient composition made with manufactured rubber waste and residues of various fatty bodies and in which a mineral mixture has been incorporated at 2.

This composition mainly comprises:

Waste from air tubes, covers, mats and the like, cut up to pieces or rasped_____ 20 to 40%
Waste from solid tyres or the like, cut up to pieces or rasped_____ 65 to 25%
Residue resulting from the treatment or purification of mineral, vegetal or animal fatty bodies which are to be easily found on the market_____ 15 to 35%

The mass is heated to 120 to 150° C. in a mixer for causing the waste to again become plastic through the medium of the residue of the fatty body.

In the paste or pulp thus obtained, is incorporated, by passage between the mixing cylinders, sulphur of supervulcanization and a mineral mixture in the following quantities:

Flowers of sulphur_____ 5 to 15%
Plastic body having the above indicated composition_____ 25 to 75%
Mineral mixture (sand, lime, cement, gravel, porphyry, sandstone powder, etc.) alone or mixed together_____ 70 to 10%

Several mixtures are preferably effected, containing a greater or less quantity of mineral filling material and from these mixtures are made sheets of suitable thickness which are placed in a mould adapted to shape the paving block, care being taken to arrange at the bottom which is provided with the cavities and grooves 3 and 4, sheets containing the greatest quantity of mineral mixture, preferably formed of large grains, then sheets containing a progressively less quantity of mineral mixture and formed of finer grains and, if necessary, a layer of rubber compound of a better quality.

Finally, the filled up mould is placed during 10 to 30 minutes under a press heated to a temperature of 150 to 175° C. and compressing the contents with a pressure of 30 to 75 kilograms per square centimeter.

After the treatment, the blocks are removed from the mould.

In the blocks obtained, the mineral mixture 2 comes to the exterior and forms an adhesive surface which firmly binds with the mortar or cement of the intermediate layer 5 serving as a connection between the above described compound plate or paving block 1 and the bed of concrete, or the brick or an agglomerate completing the block.

The upper part of the plate 1 can, if necessary, be formed of a layer of composition of a better quality and its surface can be smooth, striated or rough according to the applications and the result to be obtained.

The lower part of the plate 1 is provided with cavities 3, grooves 4, or with rough ridges for the purpose of increasing the surface through which is effected the binding of the mineral mixture incorporated in the composition and coming to the exterior with the mortar or cement of the intermediate layer 5 so as to form gripping surfaces sufficient for preventing the slipping of the paving blocks under the stresses and pulling strains of heavy vehicles running at high speed.

Thus, the rubberized composition with its mineral mixture constitutes an intermediate part which perfectly binds with an upper layer made of rubber or similar material and, on the other hand, through the mineral particles of the mixture coming to the exterior, forms a sufficient hold with the mortar or cement of the foundation for suitably securing the blocks in position.

These tiles, plates, flags, slabs, bricks, manufactured as above stated can be directly used for road paving, flagging of pavements, tiling of floors and in various constructions.

Figure 3:
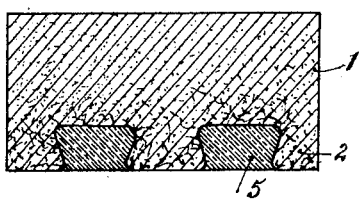
Figure 3 illustrates the same paving block the cavities of which are filled with mortar or cement.
Figure 4:
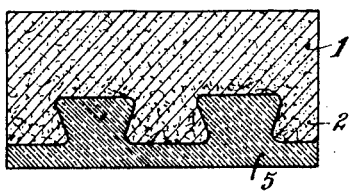
Figures 4 and 5 show the same paving block filled with mortar or cement forming an outer layer.
Figure 5:
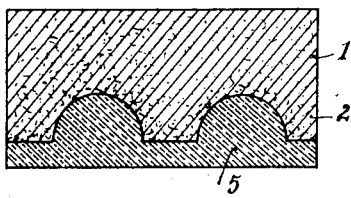

In this case, the mortar or cement is applied with a trowel on the lower surface of the plate, so as to fill up the cavities or grooves of the same, either to the level of the surface, as shown in Fig. 3, or by forming a layer entirely covering the surface, as illustrated in Figs. 4, 5 and the filled up plate is then laid on the bed of concrete newly prepared.

The mortar or cement serves as a connection between the parts of the incorporated mineral mixture which comes to the surface of the plate or paving block 1, and the concrete bed of the foundation.

The cavities 3 and grooves 4 can also be filled up with mortar or cement, or the lower surface may be covered with the latter so as to form a comparatively thin layer 5, as shown in Figs. 3, 4, 5. Thus, after drying, adhesive paving blocks are obtained which it suffices to lay on a fresh layer of mortar or cement, spread over the concrete bed, for suitably securing the said blocks to the foundation.

It is to be understood that blocks composed of the layers 1 and 5 already assembled can be subjected to vulcanization.

Figure 6:
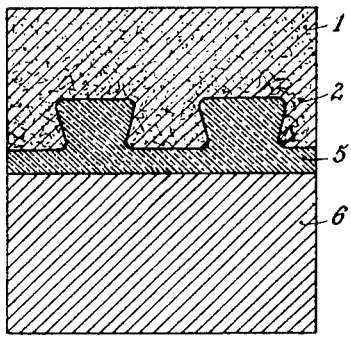
Figure 6 illustrates a plate made of manufactured rubber waste and a mineral mixture, this plate being connected by a mortar or a cement, to a brick or an agglomerate, for forming together a paving block.

Finally, it is possible to apply, through the medium of a layer 5 of mortar or cement, the same plates 1 upon bricks or agglomerates 6 so as to form single blocks, see Fig. 6, which it suffices to lay on the newly prepared concrete bed for obtaining a good paving.

What I claim as my invention and desire to secure by Letters Patent is:

1. A paving block comprising a plurality of layers of a mass containing a plastic composition of rubbery material and a mineral admixture or filler comprising comminuted rock-like material to form a unitary slab, each layer differing from the others in respect to the quantity and size of mineral filler therein, the layers being so arranged with respect to the quantity and size of filler therein that the top layer contains the smallest quantity and the smallest particles of filler and the vottom layer the largest quantity and the largest particles, to form a binding or adhesive means between the block and the mortar or cement layer or the bed of concrete.

2. A paving block comprising the block defined in claim 1 united to an under-layer of mortar or cement.

3. A paving block comprising the block defined in claim 1 secured to bricks or agglomerates and ready to be laid on a suitably prepared foundation.

In testimony whereof I affix my signature.

EDMOND DRAULLETTE.